US012752279B2

(12) United States Patent
Krauss

(10) Patent No.: US 12,752,279 B2
(45) Date of Patent: Oct. 6, 2026

(54) CRUSHER FOR MINERAL MATERIALS OR RECYCLED MATERIALS

(71) Applicant: Kleemann GmbH, Göppingen (DE)

(72) Inventor: Till Krauss, Rechberghausen (DE)

(73) Assignee: Kleemann GmbH, Göppingen (DE)

( * ) Notice: Subject to any disclaimer, the term of this patent is extended or adjusted under 35 U.S.C. 154(b) by 265 days.

(21) Appl. No.: 18/355,626

(22) Filed: Jul. 20, 2023

(65) Prior Publication Data

US 2024/0033746 A1 Feb. 1, 2024

(30) Foreign Application Priority Data

Jul. 29, 2022 (DE) ..................... 10 2022 119 153.2

(51) Int. Cl.
*B02C 1/02* (2006.01)
*B02C 1/00* (2006.01)
*B02C 23/04* (2006.01)

(52) U.S. Cl.
CPC .............. *B02C 1/025* (2013.01); *B02C 1/005* (2013.01); *B02C 23/04* (2013.01)

(58) Field of Classification Search
CPC ......... B02C 13/02; B02C 13/06; B02C 13/09; B02C 13/095; B02C 1/02; B02C 1/025; B02C 1/08
See application file for complete search history.

(56) References Cited

U.S. PATENT DOCUMENTS 5,490,636 A * 2/1996 Schrodl ................. B02C 13/095 241/242
8,844,851 B2 * 9/2014 Solomon ............... B02C 13/095 241/290

(Continued)

FOREIGN PATENT DOCUMENTS

CN 2694019 Y 4/2005
CN 202778572 U 3/2013

(Continued)

OTHER PUBLICATIONS

European Search Report for corresponding patent application No. 23182440.0, dated Dec. 21, 2023, 5 pages (not prior art).

(Continued)

*Primary Examiner* — Matthew Katcoff
(74) *Attorney, Agent, or Firm* — Lucian Wayne Beavers; Patterson Intellectual Property Law, PC

(57) ABSTRACT

The invention relates to a crusher for mineral materials or recycled materials, in particular rotary impact crushers or jaw crushers, having a crusher unit (10), which has a movable first crusher body (11), in particular a rotor or a crusher jaw, wherein a second crusher body (14), in particular an impact rocker or a crusher jaw, is assigned to the first crusher body (11), wherein a crushing gap (15) is formed between the crusher bodies (11, 14), wherein a movable assembly of an overload triggering device (30) is coupled to the first or to the second crusher body (11, 14), wherein the movable assembly has a cylinder (25) of a hydraulic cylinder (20) or a piston (23) guided in the cylinder (20), wherein the movable assembly is designed to permit a motion of the coupled crusher body (11, 14) increasing the width of the crushing gap (15) in an evasive motion, wherein a pressure chamber (24) is formed in the hydraulic cylinder (20), which pressure chamber is delimited by a piston (23), and wherein the overload triggering device (30) has a valve (23.8), which, in its open position, establishes a fluid-conveying connection between the pressure chamber (24) and a compensation area (28) and, in the closed valve position, blocks this connection. In order to achieve an efficient protection of the crusher unit 10 against overload situations in such a crusher, provision is made for the valve (28.8) to be formed between two components of the movable assembly that are movable relative to each other.

16 Claims, 4 Drawing Sheets

(56) References Cited

U.S. PATENT DOCUMENTS

| | | | |
|---|---|---|---|
| 10,183,297 B2 | 1/2019 | Jonkka | |
| 11,779,932 B2 | 10/2023 | Meyer et al. | |
| 2015/0224508 A1 | 8/2015 | Jonkka | |
| 2021/0138477 A1 * | 5/2021 | Meier | B02C 1/025 |
| 2021/0370308 A1 | 12/2021 | Meyer et al. | |

FOREIGN PATENT DOCUMENTS

| | | | |
|---|---|---|---|
| CN | 211370883 | U | 8/2020 |
| CN | 113713913 | A | 11/2021 |
| CN | 216605362 | U | 5/2022 |
| DE | 102017002079 | A1 | 9/2018 |
| DE | 102020114106 | A1 | 12/2021 |
| EP | 2888049 | A2 | 7/2015 |
| FR | 2528503 | A1 | 12/1983 |
| GB | 781004 | A | 8/1957 |
| GB | 2018895 | A | 10/1979 |
| WO | 2014029914 | A2 | 2/2014 |

OTHER PUBLICATIONS

English Translation of CN 202778572 (listed in Foreign Patent Documents).

China Office Action for corresponding patent application No. 202310875905.2, dated Jun. 22, 2026, 36 pages including English language translation (not prior art).

* cited by examiner

CRUSHER FOR MINERAL MATERIALS OR RECYCLED MATERIALS

RELATED APPLICATIONS

The present application claims priority to German application DE 10 2022 119 153.2 filed Jul. 29, 2022, which is incorporated herein by reference.

FIELD OF THE DISCLOSURE

The invention relates to a crusher for mineral materials or recycled materials, in particular a rotary impact crusher or a jaw crusher, having a crusher unit, which has a movable first crusher body, in particular a rotor or a crusher jaw, wherein a second crusher body, in particular an impact rocker or a crusher jaw, is assigned to the first crusher body, wherein a crushing gap is formed between the crusher bodies, wherein a movable assembly of an overload triggering device is coupled to the first crusher body or to the second crusher body, wherein the movable assembly has a hydraulic cylinder or a piston guided in a hydraulic cylinder, wherein the movable assembly is designed to permit a motion of the coupled crusher body increasing the width of the crushing gap in an evasive motion, wherein a pressure chamber is formed in the hydraulic cylinder, which pressure chamber is delimited by means of the piston, and wherein the overload triggering device has a valve, which, in its open position, establishes a fluid-conducting connection between the pressure chamber and a compensation area and, in the closed valve position, blocks this connection.

DESCRIPTION OF THE PRIOR ART

In these crushers according to the invention, a crushing gap is formed between the two crusher bodies. During normal operation (normal mode), the mineral material to be crushed is crushed in the crusher unit until its particle size is sufficiently small to exit the crusher unit through the crushing gap. Below the crushing gap, a conveying device may be provided, which transports the crushed material away from the work area of the crusher unit. The conveyor can be designed as an endless circulating conveyor belt. During operation, an unbreakable object or an object that is difficult to break may enter the crusher unit. This object is too large to be removed through the crushing gap. Then an overload situation occurs at the crusher unit. This overload situation can cause damage to components of the crusher. It is therefore necessary to respond to this overload situation. In the crushers according to the invention, an overload triggering device is used for this purpose. The overload triggering device has a movable assembly connected to one of the two crusher bodies, preferably the second crusher body (e.g., crushing jaw or impact rocker). The overload triggering device has a movable assembly having a hydraulic cylinder. For instance, the cylinder or the piston of the hydraulic cylinder guided in the cylinder can be part of the movable assembly of the overload triggering device. The movable assembly is supported in the hydraulic cylinder against a fluid that is pressurized in a pressure chamber of the hydraulic cylinder. Furthermore, the overload triggering device has a valve that opens as soon as the pressure in the pressure chamber reaches an impermissible threshold value as a result of an overload situation. The fluid then escapes from the pressure chamber and the pressure in the pressure chamber drops abruptly. The moving assembly is then no longer supported against the pressure and can be adjusted to open the crushing gap wide. The non-crushable object can then exit the crusher unit.

A crusher having an overload triggering device is known from EP 2 888 049 B1 (U.S. Pat. No. 10,183,297). To this end, a hydraulic cylinder is used, which has a unit as a movable assembly comprising the piston, the piston rod and a coupling piece. The coupling piece couples the movable assembly to a crushing jaw of the crusher unit. The pressure chamber of the hydraulic cylinder is connected to a hydraulic tank via a hydraulic line. A pressure valve is integrated into the hydraulic line. It opens when the pressure in the pressure chamber reaches a threshold due to an overload situation. Then the fluid is drained from the pressure chamber into the hydraulic tank. It has been shown that this type of overload protection is too sluggish when a fast opening of the crushing gap is required as a result of an overload situation. The pressure valve sometimes does not open sufficiently fast. As a result, a component of the crusher, especially the movable assembly, may be damaged.

From DE 10 2020 114 104 A1 another crusher having a hydraulic system specially designed for overload protection is known.

SUMMARY OF THE INVENTION

The invention addresses the problem of providing a crusher of the type mentioned above, which permits an efficient safeguarding of the crusher against overload situations.

This problem is solved in that the valve is formed between two components of the movable assembly that are movable relative to each other.

In an overload situation, the crusher body to which the movable assembly is connected, is deflected. This motion also moves and accelerates the assembly. As now the valve is integrated into the movable assembly according to the invention, this motion can be used to open the valve formed between two components of the assembly that can be moved relative to each other. According to the invention, the opening motion of the valve is therefore motion-controlled, which significantly improves the response behavior and thus the reaction time when an overload situation occurs.

According to a preferred embodiment of the invention, provision may be made for the movable assembly to comprise the piston, a piston rod coupled to the piston, and an inertia element, for the inertia element to be coupled to the piston or the piston rod, for the inertia element to form part of the valve, and for the inertia element to be preferably held preloaded in the closed valve position by means of a spring element. This enables a simple design that can be easily integrated into classically constructed crusher units without the need for time-consuming adaptation work. In particular, the piston rod can be moved out of the hydraulic cylinder and connected directly or indirectly to the crusher body to be supported. The motion of the crusher body results in an acceleration of the piston rod or piston. The inertia element does not follow this motion or follows it with a delay. This creates a relative motion between the inertia element and another component, such as the piston rod or piston, of the movable assembly. It can be used for opening the valve.

Alternatively, it is also conceivable that if the movable assembly comprises the cylinder of the hydraulic cylinder the inertia element is coupled to the cylinder.

If provision is made for the inertia element to be held preloaded in the closed valve position by means of a spring element, then a safe operation is possible. The spring element can then also be used to adjust the valve pressure, i.e., the pressure which keeps the components forming the valve together. In particular, the valve can then be reliably held in the closed position under the action of the spring preload. In the event of an overload, a separating force results between the inertia element and the component of the movable assembly that is in contact with the inertia element. It results from the acceleration of the unit moving relative to the inertia element multiplied by its mass and minus the spring preload and possible seal friction. If this force is positive, the valve seat opens and the fluid can escape from the pressure chamber.

For an exact valve function, provision may be made for the inertia element to have one or more guide sections by means of which it is movably guided within the cylinder between the open and the closed position of the valve.

If provision is made for the fluid-conducting connection between the pressure chamber and the compensation area to be routed inside the cylinder, then this results in a simple design that can be installed in a crusher requiring little assembly effort.

If provision is made for the inertia element to be formed by an inertia piston, which is moved in the cylinder in the same way as the piston, the valve can be formed in a simple manner, for instance between the piston and the inertia piston.

If provision is made for the piston rod to be guided through the compensation area into the environment, and for the fluid-conducting connection between the pressure chamber and the compensation area to comprise a discharge channel formed by the piston, and/or for the fluid-conducting connection to comprise a fluid guide formed by the inertia element, then a robust design can be created in a simple manner. Particularly advantageously, the fluid-conducting connection is at least partially protected from mechanical effects within the cylinder.

It has been shown that the overload release safety device is particularly effective if provision is made for the inertia piston to have a sealing piece and the piston to have a valve seat, for the sealing piece and the valve seat to form parts of the valve, and for the sealing piece to be seated on the valve seat to block the connection between the pressure chamber and the compensation area in the closed position of the valve.

A crusher according to the invention may also be characterized in that the inertia piston has a bolt mount, into which a mounting bolt is inserted and bolted into a threaded mount of the piston, wherein the central longitudinal axis of the mounting bolt extends in the direction of the longitudinal axis of the cylinder, in that a/the spring element, which, in the closed position, braces the inertia piston with respect to the piston, acts on the mounting bolt, and in that the inertia piston is mounted in such a way that it can be moved relative to the piston from the closed position into the open position of the valve while increasing the preload of the spring element.

A stable design for transmitting large forces can be implemented in a simple manner in such a way that the piston has a piston crown adjoined by a securing piece, that the piston rod has a mounting neck connected to the securing piece and that between the piston rod and the securing piece an overflow area of the fluid-conducting connection is formed between the pressure chamber and the compensation area.

For discharging the amount of oil that can no longer be held by the compensation area in the event of an overload and for pressure protection of the compensation area during normal operation of the crusher, provision may be made for the compensation area to be connected to a pressure valve via a pressure line. For this purpose, the hydraulic fluid can be discharged in an orderly manner after the occurrence of an overload situation if provision is made for a hydraulic line downstream of the pressure valve to be routed to a tank, and for the pressure valve to open after the valve has been triggered as a result of an overload situation at the crusher unit in order to discharge hydraulic fluid from the compensation area into the tank.

After an overload event, the crushing gap can be easily readjusted if provision is made for the pressure chamber to have a connecting piece with a hydraulic connection, for the pressure chamber to be connected to a pressure generator via the hydraulic connection, and for the hydraulic fluid to be fed into the pressure chamber via the hydraulic connection by means of the pressure generator in order to increase the volume of the pressure chamber.

BRIEF DESCRIPTION OF THE DRAWINGS

The invention is explained in greater detail below based on an exemplary embodiment shown in the drawings. In the figures.

DETAILED DESCRIPTION

Figure 1:
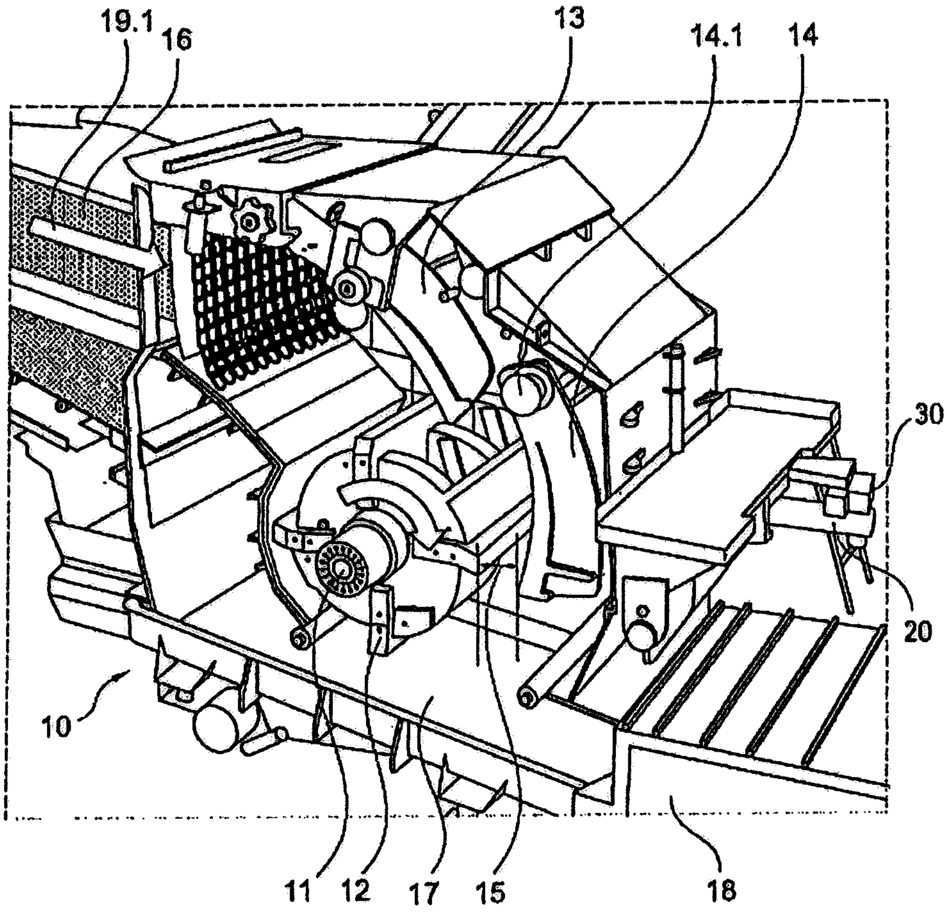
FIG. 1 shows a perspective schematic diagram of a crusher unit of a rotary impact crusher with connected machine components of the crusher.

FIG. 1 shows a crusher unit 10 of a rotary impact crusher. The crusher unit 10 comprises a crusher housing, in which a movable crusher body 11 is rotatably mounted. Accordingly, the movable crusher body 11 is designed as a rotor. The rotor bears impact bars 12 in the area of its outer circumference.

An upper impact rocker 13 is disposed inside the crusher housing. Furthermore, another crusher body 14 is also disposed in the crusher housing, which in this case forms a lower impact rocker.

A crushing gap 15 is formed between the rotor (movable crusher body 11) and the lower impact rocker (crusher body 14). When the rotor rotates, the radially outer ends of the impact bars 12 form an outer crushing circle. This crushing circle, in conjunction with a facing surface of the lower impact rocker, forms the crushing gap 15. A swivel bearing 14.1 is used to swivel mount the lower impact rocker 14. The width of the crushing gap 15 can be adjusted via the selected swivel position of the lower impact rocker.

As FIG. 1 further shows, a material feed 16 can be assigned to the crusher unit 10. This material feed 16 can be used to convey material 19.1 to be crushed into the crushing chamber. The conveying direction is symbolized by an arrow in FIG. 1. When the material 19.1 to be crushed enters the area of the rotor, the impact bars 12 fling it outwards. In this process, this material hits the upper impact rocker 13 and the lower impact rocker 14. The material to be crushed 19.1 breaks when it hits the impact bar or the two impact rockers.

Figure 2:
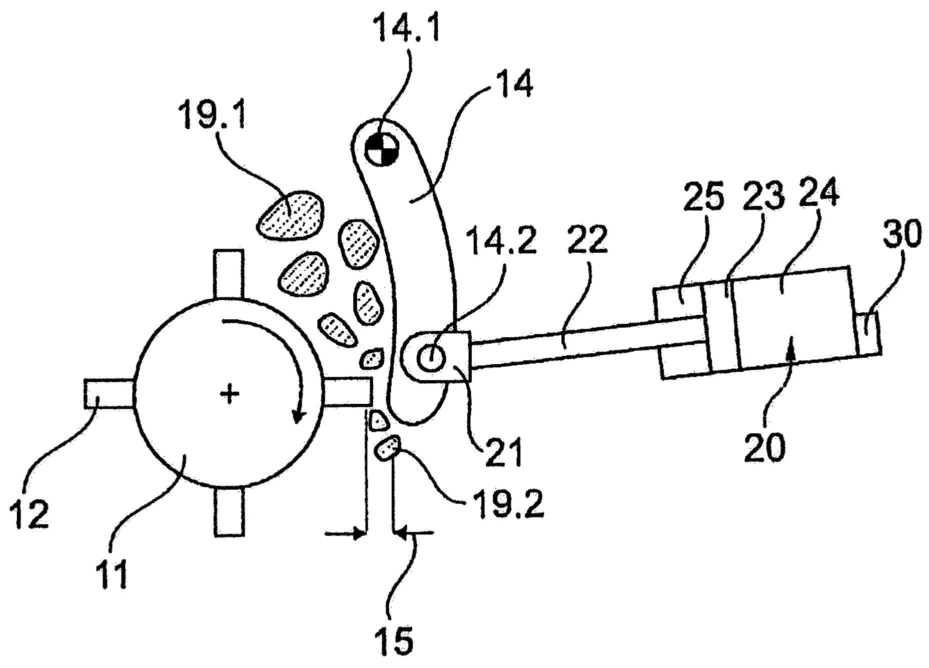
FIGS. 2 and 3 show schematic diagrams of the crusher unit according to FIG. 1 having an overload triggering device.
Figure 3:
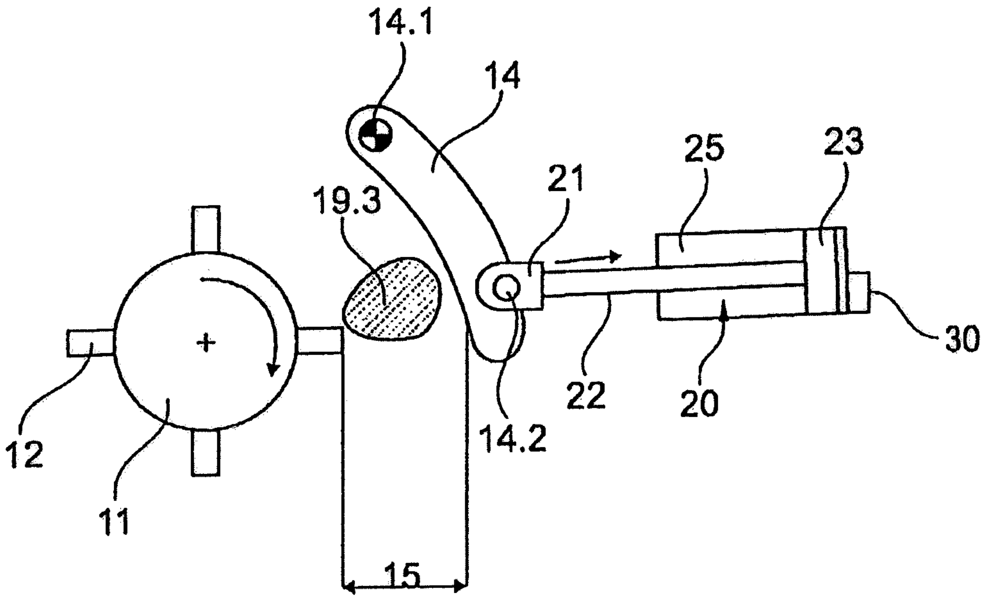

This is shown in more detail in FIGS. 2 and 3 by way of example of the lower impact rocker. When the material to be crushed 19.1 hits the crusher body 14, crushed material 19.2 is produced, as shown in FIG. 2. As soon as this crushed material has a grain size smaller than the crushing gap 15, this crushed material 19.2 falls through the crushing gap 15. Then it enters a collection area 17 below the movable crusher body 11 (rotor). As FIG. 1 shows, a conveyor 18 is connected to the collection area 17. This conveyor 18 can be used to remove the crushed material 19.2.

As FIG. 2 further shows, a hydraulic cylinder 20 is used to support the crusher body 14 relative to the machine structure of the crusher. The support at the machine structure, for instance at the machine frame of the crusher, is not detailed in the drawings. However, FIG. 1 shows that the hydraulic cylinder 20 is installed in a protected manner mainly outside the crusher housing in which the rotor is mounted.

As shown in FIGS. 2 and 3, the hydraulic cylinder 20 has a cylinder 25, in which a piston 23 is movably guided. The piston 23 bears a piston rod 22. The piston rod 22 is equipped with a coupling piece 21 at its end facing away from the piston 23, which coupling piece has a bearing part 21.1. This bearing part 21.1 is used to connect the coupling piece 21 to a bearing 14.2 of the crusher body 14. In this way, the hydraulic cylinder 20 is swivel mounted to the crusher body 14. The coupling point is at a distance from the swivel bearing 14.1.

As FIG. 2 shows, the piston 23 delimits a pressure chamber 24 in the cylinder 25. Hydraulic fluid, in particular hydraulic oil, is filled into the pressure chamber 24. The piston 23 is supported against this medium. In this way, the piston rod 22 and the crusher body 14 are held in the predetermined crushing position shown in FIG. 2.

Depending on the crushing task at hand, the operating position of the crushing gap 15 has to be adjusted accordingly. The crusher has a control device for this purpose. If, starting from the position shown in FIG. 2, the crushing gap 15 is to be widened, hydraulic fluid is drained from the pressure chamber 24. This causes the piston 23 to move further into the cylinder 25 until the desired crushing gap 15 has been set. On the other hand, if a narrower crushing gap 15 is desired, additional hydraulic fluid is added to the pressure chamber 24. This moves the piston 23 while enlarging the pressure chamber 24. The piston rod 22 continues to move out of the cylinder 25. This causes the crusher body 14 to swivel clockwise, resulting in a narrowing of the crushing gap 15.

As shown in FIGS. 1 to 3, an overload triggering device 30 is used.

Figure 4:
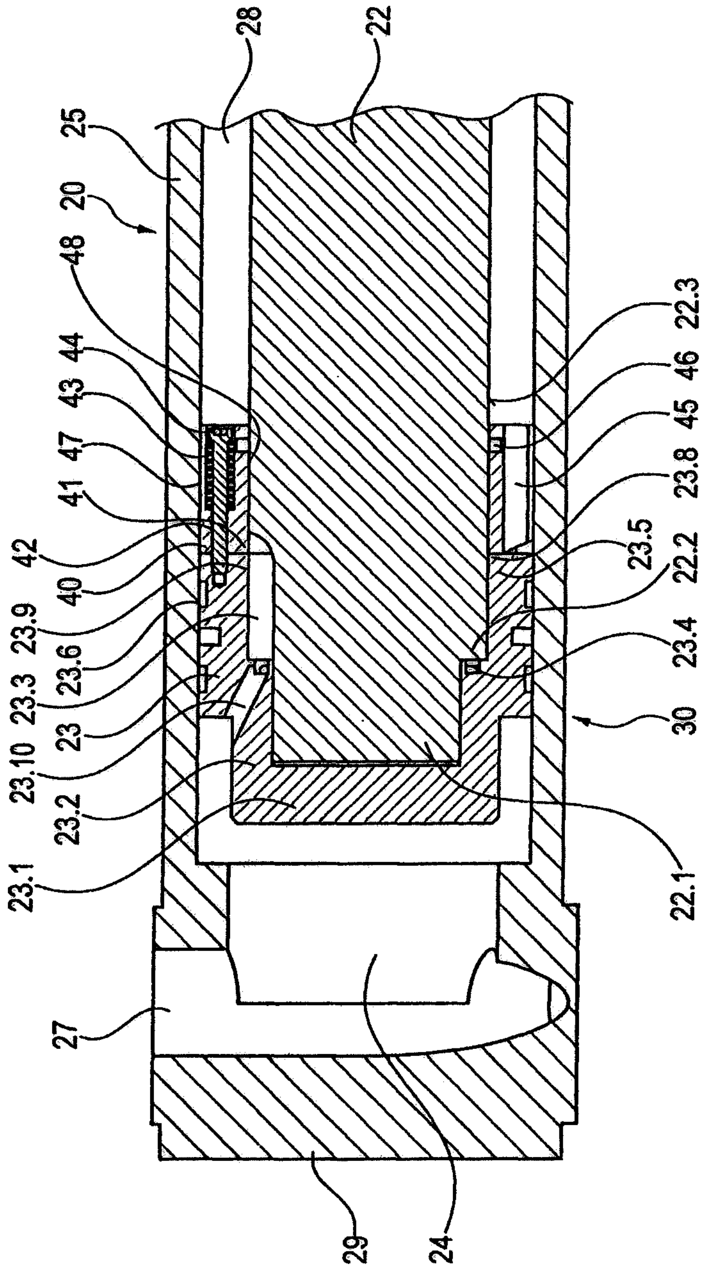
FIG. 4 shows an enlarged detail and a section of a hydraulic cylinder of an overload triggering device.

The overload triggering device 30 includes a hydraulic cylinder 20 as shown in FIG. 4. The hydraulic cylinder 20 has a cylinder 25, in which a piston 23 is guided in a linearly movable manner. Inside the cylinder 25, the piston 23 subdivides one area into two. In particular, the pressure chamber 24 is formed at one end of the piston 23 and a compensation area 28 is formed at the opposite end of the piston 23.

The pressure chamber 24 is partially delimited by a connection piece 29, which has a hydraulic port 27. The hydraulic port 27 of the connector 29 may be integrally connected to the cylinder 25.

The pressure chamber 24 may further be delimited by a piston crown 23.1 of the piston 23, as FIG. 4 shows.

A simple design then results for the piston 23 when a securing piece 23.2 adjoins the piston crown 23.1. For instance, the securing piece 23.2 may be used to secure a piston rod 22, which is firmly connected to the piston 23. The piston rod 22 is guided through the compensation area 28 into the environment in a sealed manner.

FIG. 4 shows that for securing the piston rod 22, for instance, the piston rod 22 can be equipped with a mounting neck 22.1, which can be inserted into the securing piece 23.2. In this case, the piston rod 22 may be secured on its mounting neck 22.1 by means of a male thread, which is bolted into a female thread of the securing piece 23.2.

For the axial support of the piston rod 22 relative to the piston 23, provision may be made for the piston rod 22 and the piston 23, which is provided in addition or as an alternative to the threaded connection mentioned above, to be connected in a form-fitting manner. In the exemplary embodiment shown in FIG. 4, a support section 22.2 of the piston rod 22 forms a form-fitting connection between the piston rod 22 and the piston 23. This support section 22.2 is in contact with a support shoulder of the piston 23 in the axial direction of the piston rod 22 in a form-fitting manner. For sealing purposes, a circumferential seal 23.4 can be provided in this area. The form-fitting connection can preferably be such that the piston 23 is supported relative to the piston rod 22 in the direction from the pressure chamber 24 toward the compensation area 28 in a form-fitting manner. As FIG. 4 shows, i.e., from left to right. In this way, high pressures occurring in the pressure chamber 24 can be transferred to the piston rod 22 via the piston 23 and the positive connection.

According to one conceivable embodiment, the piston 23 may have a sealing section 23.5, which, on its circumference facing away from the piston rod 22, is equipped with one or more piston seals 23.6, which seal the piston 23 circumferentially against the inner wall of the cylinder 25. In this regard the sealing section 23.5 is integrally secured at the end of the securing piece 23.2 facing away from the piston crown 23.1.

FIG. 4 further shows that an inertia element 40 can be disposed in the interior of the cylinder 25, preferably in the compensation area 28. The inertia element 40 forms part of a valve 23.8. In this regard the inertia element 40 may have a circumferential sealing piece 41. A valve seat 23.9, which is also circumferential, can abut this circumferential sealing piece 41 to establish a closed position of the valve 23.8. Preferably, the piston 23 may form the circumferential valve seat 23.9, as shown in FIG. 4. Particularly preferably, the securing piece 23.2 of the piston 23 can form the circumferential valve seat 23.9.

As FIG. 4 further illustrates, the inertia element 40 may preferably be formed as an inertia piston. In this regard the inertia piston may be moved inside the cylinder so as to be movable to a limited extent in the axial direction of the piston rod 22. For guiding the inertia piston, provision may be made for the latter to be linearly movably guided by a guide section 48 on the outer contour of the piston rod 22. Particularly preferably, the guide section 48 forms an inner cylinder, which is guided on a cylindrical outer contour of the piston rod 22, which in this way forms a guide section 22.3.

Additionally or alternatively, provision may also be made for the inertia piston to have a cylindrical outer contour forming a guide section 47. This guide section 47 can be used to guide the inertia piston on the cylindrical inner contour of the cylinder 25.

FIG. 4 further illustrates that the inertia element 40, preferably the inertia piston is disposed to be movable relative to the piston 23, wherein this movement may be against the preload of a spring element 43. In this regard the spring element 43 may preload the inertia element 40 against the piston 23 in the closed position of the valve 23.8. In particular, this preload is transmitted in such a way that, in the closed position, the sealing piece 41 is pressed onto the valve seat 23.9 and held there in a preloaded manner.

FIG. 4 shows that to achieve the functionality described above, for instance, the inertia element 40 has a bolt mount 42, through which a mounting bolt 44 is passed and bolted into a threaded seat of the piston 23. In this regard, the inertia element 40 may have a spring mount collinear with the bolt mount 42, into which the spring element 43, designed as a coil spring, is inserted. The mounting bolt 44 can be designed such that its bolt shank passes through the space surrounded by the spring element 43, wherein the spring element 43 is supported on the bolt head of the mounting bolt 44 on the one hand and on the bottom of the spring mount on the other hand to apply the preload.

The inertia element 40 can be moved against the preload of the spring element 43 in the axial direction of the piston rod 22 to lift the sealing piece 41 off the circumferential valve seat 23.9 and to move the valve 23.8 to the open position.

Preferably, a plurality of mounting bolts 44 having spring elements 43 may be provided for mounting the inertia element 40 to the piston 23, wherein these mounting bolts 44 or the spring elements 43 are disposed uniformly distributed in the circumferential direction of the inertia element 40.

FIG. 4 illustrates that the piston 23 has at least one discharge channel 23.10, which forms a spatial connection between the pressure chamber 24 and an overflow area 23.3. Preferably, the overflow area 23.3 is located between the part of the pressure chamber 24 delimited by the piston crown 23.1 and the compensation area 28, as shown in FIG. 4. It is particularly preferred that the overflow area 23.3 is delimited between the outer contour of the piston rod 22 and an inner contour of the piston 23, preferably the inner contour of the securing piece 23.2.

FIG. 4 further illustrates that the inertia element 40, preferably the inertia piston, comprises at least one return 45 disposed to provide a spatial connection between the overflow area 23.3 and the compensation area 28 when the valve 23.8 is open.

In the assembled state, the cylinder 25 is preferably mounted in such a way that it is held fixed in the axial direction of the piston rod 22. It is conceivable, however, that the cylinder 25 is swivel mounted.

The piston rod 22, the inertia element 40, in particular the inertia piston, and the piston 23 form a movable assembly. As explained above, the coupling piece 21 can be used to couple this movable assembly to the crusher body 14, for instance an impact rocker or crushing jaw.

The operating principle of the hydraulic cylinder 20 is explained in more detail below. To adjust the crushing gap 15 between the two crusher bodies 11 and 14, the hydraulic fluid held in the pressure chamber 24 is pressurized until the desired crushing gap width is set. At the same time, the hydraulic fluid held in the compensation area 28, which is also pressurized, is drained until the desired crushing gap width is reached and the piston 23 has assumed a corresponding position.

Once the crushing gap 15 is set, the crusher can operate in normal mode and crush the supplied material to be crushed 19.1 to obtain the desired crushed material 19.2.

If an overload occurs, for instance because a non-crushable object 19.3 or an object that is difficult to crush enters the work area between the two crusher bodies 11,14, a high force is suddenly applied to the crusher body 14. As a result of this force, the crusher body 14 gives way, for instance it swivels around the axis of the swivel bearing 14.1.

The movable assembly transfers this motion to the hydraulic cylinder 30. In this example, the piston rod 22 transfers this motion to the piston 23. In the process, the hydraulic medium is compressed in the pressure chamber 24.

Because the piston rod 23 is now accelerated as a result of this motion, a relative motion occurs between the piston 23 and the inertia element 40 due to the inertia force acting on the inertia element 40. This relative motion causes the preload of the spring element(s) 43 to increase and the valve 23.8 to open. In detail, the sealing piece 41 is then lifted off the valve seat 23.9.

In this way, a fluid-conducting connection is established from the pressure chamber 24 via the discharge channel 23.10 and the overflow area 23.3 and the fluid guide 45 of the inertia element 40 to the compensation area 28. Accordingly, the pressure in the pressure chamber 24 can abruptly drop toward the compensation area 28 via this fluid conducting connection. As a result, the crushing gap 15 opens rapidly, as the piston rod 22 can now move further towards the pressure chamber 24 using little force. Now the unbreakable object 13.3 can fall through the crushing gap 15.

After the overload situation has ended, the desired width of the crushing gap 15 can be reset as described above.

According to the invention, the valve 23.8 is now controlled by the motion of the movable assembly, for instance, as in this case, by the motion of the piston rod 22, which results in a relative motion of the piston with respect to the inertia element 40.

After the overload situation has ended, the spring element(s) 43 move the inertia element 40 and the piston 23 together again to effect the closed position of the valve 23.8.

Figure 5:
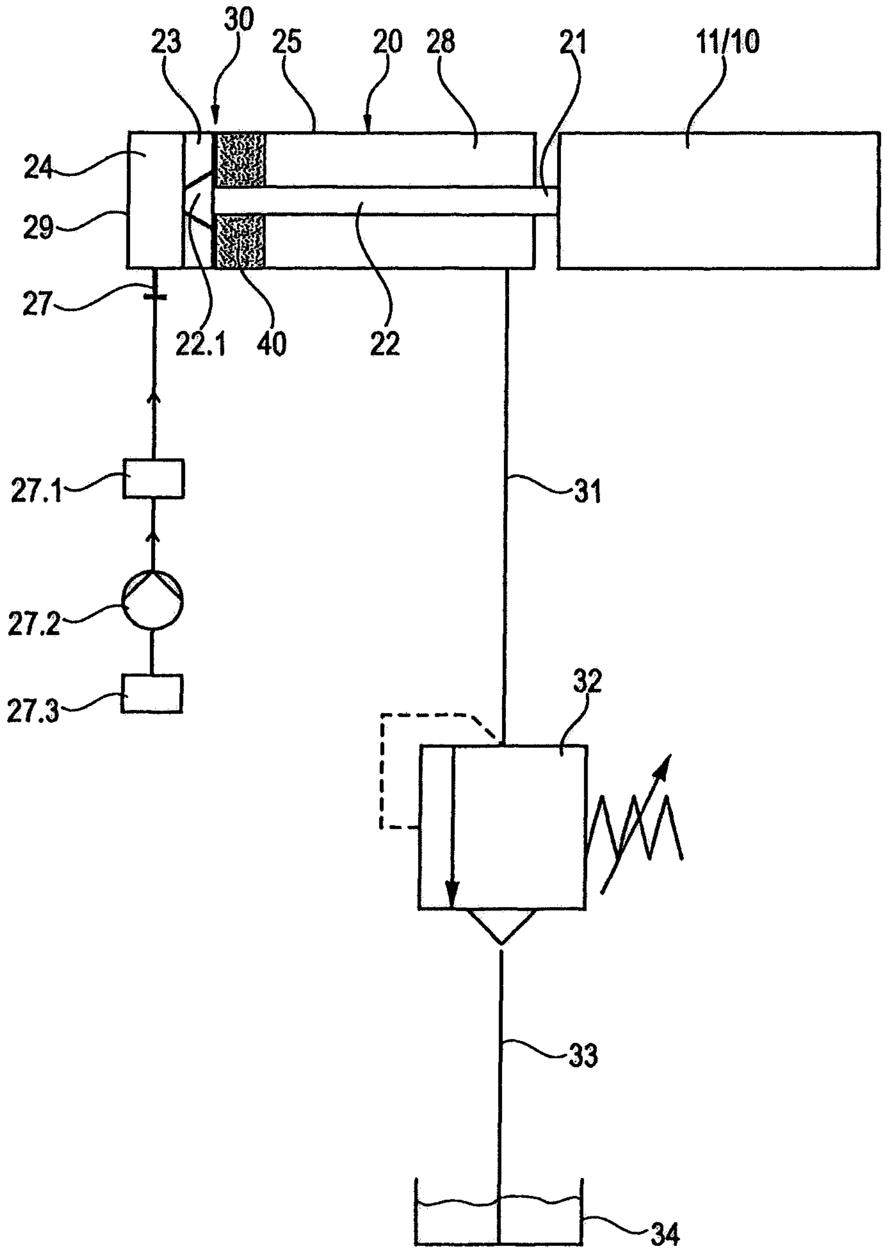
FIG. 5 shows a schematic representation of the integration of the hydraulic cylinder of FIG. 4 into a hydraulic system.

FIG. 5 illustrates that the compensation area 28 is connected to a pressure valve 32 via a pressure line 31. A hydraulic line 33 leads from the pressure valve 32 and opens into a tank 34.

The pressure valve 32 is designed in such a way that during normal operation it safeguards the pressure in the compensation area 28 and additionally discharges the quantity of oil that can no longer be held during overload to the tank.

If the piston 23 is now moved in the event of an overload and the fluid is forced from the pressure chamber 24 into the compensation area 28, the pressure valve 32 can be used to discharge excess hydraulic medium from the compensation area 28 through the pressure valve 32. Specifically, this involves an increase in pressure in the compensation area 28, which causes the pressure valve 32 to open and the hydraulic medium to be discharged into the tank 34.

FIG. 5 also illustrates that the pressure chamber 24 may be connected to a pressure generator 27.2 via its hydraulic connection. The pressure generator 27.2 can be used to pump hydraulic fluid from a reservoir 27.3 into the pressure chamber 24 to adjust the crushing gap 15. Furthermore, a pressure valve 27.1 can be disposed upstream of the hydraulic connection 27 and downstream of the pressure generator 27.2 to safeguard the pressure in the pressure chamber 24.

As the above discussion illustrates, the invention relates to a crusher for mineral materials or recycled materials, in particular a rotary impact crusher or a jaw crusher, comprising a crusher unit 10. The crusher unit 10 has a movable first crusher body 11, in particular a rotor or a crushing jaw, and a second crusher body 14, in particular an impact rocker or a crushing jaw, is assigned to the first crusher body 11. The crushing gap 15 is formed between the crusher bodies

11, 14, wherein the movable assembly of the overload triggering device 30 is coupled to the second crusher body 14. The movable assembly comprises the cylinder 25 of the hydraulic cylinder 20 or, as in the exemplary embodiment shown, a piston 23 guided in the cylinder 25, wherein the movable assembly is designed to permit, in an evasive motion, a motion of the coupled crusher body 14, which increases the width of the crushing gap 15. The overload triggering device 30 comprises the valve 23.8, which in its open position establishes a fluid-conducting connection between the pressure chamber 24 and the compensation area 28 and in the closed valve position blocks this connection. According to the invention, the valve 28.8 is formed between two relatively movable components of the movable assembly, in this case between the inertia element 40 and the piston 23.

The invention claimed is:

1. A crusher for mineral materials or recycled materials, comprising:

a crusher unit including a first crusher body and a second crusher body, wherein a crushing gap is formed between the first crusher body and the second crusher body;

a hydraulic cylinder including a cylinder, a piston and a piston rod, the hydraulic cylinder including a pressure chamber delimited by the piston;

an overload triggering device coupled to one of the first and second crusher bodies to permit an evasive motion of the one of the first and second crusher bodies increasing a width of the crushing gap, the overload triggering device including a movable assembly and a valve;

wherein the movable assembly includes two components that are movable relative to each other, a first component of the two components being the cylinder or the piston or the piston rod of the hydraulic cylinder, a second component of the two components being an inertia element coupled to the first component; and wherein the valve is formed by the two components of the movable assembly that are movable relative to each other to define an open position establishing a fluid-conveying connection between the pressure chamber and a compensation area, and to define a closed position blocking the fluid-conveying connection.

2. The crusher for mineral materials or recycled materials of claim 1, wherein:

the movable assembly includes the piston, the piston rod coupled to the piston, and the inertia element coupled to the piston or the piston rod, wherein the first and second components of the movable assembly forming the valve are the piston and the inertia element.

3. The crusher for mineral materials or recycled materials of claim 2, further comprising:

a spring biasing the inertia element toward the closed position of the valve.

4. The crusher for mineral materials or recycled materials of claim 1, wherein:

the movable assembly includes the cylinder and the inertia element coupled to the cylinder, wherein the first and second components of the movable assembly forming the valve are the cylinder and the inertia element.

5. The crusher for mineral materials or recycled materials of claim 1, wherein:

the inertia element includes one or more guide sections configured to movably guide the inertia element within the cylinder between the open position and the closed position of the valve.

6. The crusher for mineral materials or recycled materials of claim 1, wherein:

the fluid-conveying connection between the pressure chamber and the compensation area is routed inside the cylinder.

7. The crusher for mineral materials or recycled materials of claim 1, wherein:

the inertia element is movably guided inside a receiving space of the cylinder.

8. The crusher for mineral materials or recycled materials of claim 7, wherein:

the inertia element includes a guide section mounted on the piston rod of the piston of the hydraulic cylinder so that the inertia element is guided for movement in a longitudinal direction of the piston rod.

9. The crusher for mineral materials or recycled materials of claim 1, wherein:

the piston rod extends from the piston through the compensation area; and wherein the fluid-conveying connection between the pressure chamber and the compensation area includes a discharge channel formed in the piston.

10. The crusher for mineral materials or recycled materials of claim 9, wherein:

the fluid-conveying connection between the pressure chamber and the compensation area further includes a fluid guide formed by the inertia element.

11. A crusher for mineral materials or recycled materials, comprising:

a crusher unit including a first crusher body and a second crusher body, wherein a crushing gap is formed between the first crusher body and the second crusher body;

a hydraulic cylinder including a cylinder and a piston guided in the cylinder, the hydraulic cylinder including a pressure chamber delimited by the piston;

an overload triggering device coupled to one of the first and second crusher bodies to permit an evasive motion of the one of the first and second crusher bodies increasing a width of the crushing gap, the overload triggering device including a movable assembly and a valve; and wherein the valve is formed between two components of the movable assembly that are movable relative to each other to define an open position establishing a fluid-conveying connection between the pressure chamber and a compensation area, and to define a closed position blocking the fluid-conveying connection, one of the two components forming the valve being the cylinder or the piston;

wherein the movable assembly includes an inertia piston coupled to the piston or the cylinder of the hydraulic cylinder, wherein the inertia piston is one of the two components forming the valve, and wherein the inertia piston includes a sealing piece;

wherein the piston of the hydraulic cylinder includes a valve seat; and wherein in the closed position of the valve the sealing piece is seated on the valve seat to block the fluid-conveying connection between the pressure chamber and the compensation area.

12. A crusher for mineral materials or recycled materials, comprising:

a crusher unit including a first crusher body and a second crusher body, wherein a crushing gap is formed between the first crusher body and the second crusher body;

a hydraulic cylinder including a cylinder and a piston guided in the cylinder, the hydraulic cylinder including a pressure chamber delimited by the piston;

an overload triggering device coupled to one of the first and second crusher bodies to permit an evasive motion of the one of the first and second crusher bodies increasing a width of the crushing gap, the overload triggering device including a movable assembly and a valve; and wherein the valve is formed between two components of the movable assembly that are movable relative to each other to define an open position establishing a fluid-conveying connection between the pressure chamber and a compensation area, and to define a closed position blocking the fluid-conveying connection, one of the two components forming the valve being the cylinder or the piston;

wherein the movable assembly includes an inertia piston movable relative to the piston of the hydraulic cylinder, a mounting bolt extending through the inertia piston and threadedly connected to the piston of the hydraulic cylinder, the mounting bolt having a longitudinal axis parallel to a longitudinal axis of the cylinder, a spring element received about the mounting bolt and configured to bias the inertia piston toward the piston of the hydraulic cylinder, the inertia piston being movable from the closed position of the valve to the open position of the valve while increasing a preload of the spring.

13. The crusher for mineral materials or recycled materials of claim 1, wherein:

the piston includes a piston crown adjoined by a securing piece;

the piston rod includes a mounting neck connected to the securing piece; and the fluid-conveying connection between the pressure chamber and the compensation area includes an overflow area formed between the piston rod and the securing piece.

14. The crusher for mineral materials or recycled materials of claim 1, further comprising:

a tank;

a pressure valve;

a pressure line connecting the compensation area to the pressure valve;

a hydraulic line connecting the pressure valve to the tank;

wherein the pressure valve is configured to open after the valve of the overload triggering device has been triggered as a result of an overload situation at the crusher unit in order to discharge hydraulic fluid from the compensation area into the tank.

15. The crusher for mineral materials or recycled materials of claim 1, further comprising:

a pressure generator; and wherein the pressure chamber is connected to the pressure generator via a hydraulic port so that hydraulic fluid can be fed into the pressure chamber in order to increase a volume of the pressure chamber.

16. The crusher for mineral materials or recycled materials of claim 1, wherein:

one of the first and second components includes a sealing piece;

the other of the first and second components includes a valve seat; and in the closed position of the valve the sealing piece is seated on the valve seat to block the fluid-conveying connection between the pressure chamber and the compensation area.

* * * * *